(12) United States Patent
Aggarwal et al.

(10) Patent No.: US 12,182,159 B2
(45) Date of Patent: *Dec. 31, 2024

(54) MAPPING OF UNLABELED DATA ONTO A TARGET SCHEMA VIA SEMANTIC TYPE DETECTION

(71) Applicant: Adobe Inc., San Jose, CA (US)

(72) Inventors: Simran Aggarwal, Holland Hill (SG); Rishika Karira, Bangalore (IN); Shefali Srivastava, Delhi (IN)

(73) Assignee: Adobe Inc., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/328,588

(22) Filed: Jun. 2, 2023

(65) Prior Publication Data

US 2023/0350913 A1    Nov. 2, 2023

Related U.S. Application Data

(63) Continuation of application No. 17/241,883, filed on Apr. 27, 2021, now Pat. No. 11,709,858.

(51) Int. Cl.
*G06F 16/25* (2019.01)
*G06F 16/21* (2019.01)
(Continued)

(52) U.S. Cl.
CPC .......... *G06F 16/258* (2019.01); *G06F 16/212* (2019.01); *G06F 16/24522* (2019.01);
(Continued)

(58) Field of Classification Search
CPC ................. G06F 16/258; G06F 16/212; G06F 16/24522; G06F 16/285; G06F 40/40; G06F 16/355; G06N 20/00; G06N 3/0455
(Continued)

(56) References Cited

U.S. PATENT DOCUMENTS 10,474,962 B2   11/2019   Hakkani-tur et al.
10,592,493 B1    3/2020   Sutherland et al.
(Continued)

OTHER PUBLICATIONS

Madhavan, J., et al., "Generic Schema Matching with Cupid", Proceedings of the 27th VLDB Conference, Roma, Italy, pp. 1-10 (2001).

(Continued)

*Primary Examiner* — Hicham Skhoun
(74) *Attorney, Agent, or Firm* — Shook, Hardy & Bacon L.L.P.

(57) ABSTRACT

Automatically mapping unlabeled input data onto a target schema via semantic type detection is described. The input data includes data elements that are structured as 2D table rows and columns forming cells. Each data element is included in a cell. The target schema includes a set of fields. Schema mapping includes mapping each column to one or more fields. More particularly, the fields are clustered into field clusters, where each field cluster includes one or more of the fields. Each column is automatically mapped to one of the field clusters of the set of field clusters. The mapping between schema fields and data columns is automatically performed based on appropriate pairings of the detected semantic types, where the semantic types are encoded in vector representations of the fields, the field clusters, and the data elements.

20 Claims, 9 Drawing Sheets

(51) Int. Cl.
 *G06F 16/2452* (2019.01)
 *G06F 16/28* (2019.01)
 *G06F 40/40* (2020.01)
 *G06N 20/00* (2019.01)

(52) U.S. Cl.
 CPC ............ *G06F 16/285* (2019.01); *G06F 40/40* (2020.01); *G06N 20/00* (2019.01)

(58) Field of Classification Search
 USPC ........................................................ 707/760
 See application file for complete search history.

(56) References Cited

U.S. PATENT DOCUMENTS

| | | |
|---|---|---|
| 2005/0187897 A1 | 8/2005 | Pawar et al. |
| 2006/0253476 A1 | 11/2006 | Roth et al. |
| 2008/0021912 A1 | 1/2008 | Seligman et al. |
| 2008/0281820 A1 | 11/2008 | Do et al. |
| 2009/0077055 A1 | 3/2009 | Dillon et al. |
| 2013/0151491 A1 | 6/2013 | Gislason |
| 2014/0067363 A1 | 3/2014 | Ogren et al. |
| 2014/0279747 A1 | 9/2014 | Strassner |
| 2018/0165362 A1 | 6/2018 | Engelko et al. |
| 2019/0213039 A1 | 7/2019 | Lecue et al. |
| 2019/0377807 A1 | 12/2019 | Dean et al. |
| 2020/0210520 A1 | 7/2020 | Akyamac et al. |
| 2020/0394164 A1 | 12/2020 | Apte et al. |
| 2021/0117437 A1 | 4/2021 | Gibson |
| 2022/0179833 A1 | 6/2022 | Ramalingam et al. |

OTHER PUBLICATIONS

Bernstein, A. P., et al., "Generic Schema Matching, Ten Years Later", Proceedings of the VLDB Endowment, vol. 4, No. 11, pp. 1-7 (2011).

Castano, S., et al., "Global Viewing of Heterogeneous Data Sources", IEEE Transactions on Knowledge and Data Engineering, vol. 13, No. 2, pp. 277-297 (2001).

Do, H. H., and Erhard, R., "COMA—A system for flexible combination of schema matching approaches", Proceedings of the 28tli VLDB Conference, Hong Kong, China, pp. 1-12 (2002).

Saake, G., et al., "Rule-based schema matching for ontology-based mediators", Journal of applied Logic, 3(2), pp. 253-270 (2005).

Berlin, J., and Motro, A., "Database Schema Matching Using Machine Learning With Feature Selection", International Conference on Advanced Information Systems Engineering, pp. 452-466 (May 2002).

Hulsebos, M., et al., "Sherlock: A Deep Learning Approach to Semantic Data Type Detection", In Proceedings of the 25th ACM SIGKDD International conference on Knowledge Discovery & Data Mining, pp. 1500-1508 (Jul. 2019).

Sahay, T., et al., "Schema Matching using Machine Learning", In 2020 7th International Conference on Signal Processing and Integrated Networks (SPIN), pp. 1-7 (2020).

Madhavan, J., et al., "Corpus-based Schema Matching", In 21st International Conference on Data Engineering (ICDE'05), pp. 1-12 (2005).

Fernandez, R, C., et al., "Seeping Semantics: Linking Datasets using Word Embeddings for Data Discovery", In 2018 IEEE 34th International conference on Data Engineering (ICDE), pp. 1-12 (2018).

Sorrentino, S., et al., "Schema Normalization for Improving Schema Matching", DII—University of Modena and Reggio Emilia, Italy, pp. 1-14 (2009).

Ratinov, L., and Gudes, E., "Abbreviation Expansion in Schema Matching and Web Integration", Computer Science Department, Ben Gurion University, pp. 1-5 (2004).

Koutras, C., et al. "REMA: Graph Embeddings-based Relational Schema Matching", EDBT/ICDT 2020 Joint Conference, pp. 1-4 (2020).

Valera, I., and Ghahramani, Z., "Automatic Discovery of the Statistical Types of Variables in a Dataset", proceedings of the 34 th International Conference on Machine Learning, Sydney, Australia, PMLR 70, 2017, pp. 1-9 (2017).

Rummele, N., et al., "Evaluating approaches for supervised semantic Labelling", arXiv preprint arXiv:1801.09788, pp. 1-16 (2018).

Pham, M., et al., "Semantic labeling: A domain-independent approach", University of Southern California, pp. 1-16 (2016).

Chen, Z., et al., "Generating Schema Labels through Dataset Content Analysis", Lehigh University Bethlehem, PA, pp. 1-8 (2018).

Auer, S., et al., "DBpedia: A Nucleus for a Web of Open Data", Universität Leipzig, Department. of Computer Science, Johannessen, pp. 722-735 (2007).

Notice of Allowance dated Mar. 7, 2023 in U.S. Appl. No. 17/241,883, 12 pages.

MAPPING OF UNLABELED DATA ONTO A TARGET SCHEMA VIA SEMANTIC TYPE DETECTION

CROSS-REFERENCE TO RELATED APPLICATION

This application is a Continuation Applications of U.S. patent application Ser. No. 17/241,883 titled, "MAPPING OF UNLABELED DATA ONTO A TARGET SCHEMA VIA SEMANTIC TYPE DETECTION" filed on Apr. 27, 2021 which is incorporated herein by reference in its entirety.

BACKGROUND

Our world is driven by data processed by automatic means (e.g., computational systems that include a combination of hardware and software). To process data, most computational systems require the input data to be structured (e.g., formatted) in a specific data schema (e.g., a known structure or format). Frequently, the input data may be acquired (or received) without structure, or if structured, within a format that does not precisely match the data schema that the computation system expects. In such scenarios, prior to being processed, the input data must be "mapped" or transformed into the appropriate data schema. Traditionally, this mapping has been performed via manual means. However, such manual means tends to be intensive and/or time consuming. As we rely more and more on data, the data schemas that computational systems employ (and the input data) are trending towards the more complex in nature. Accordingly, the manual effort required to map input data to expected target schemas is continues to increase.

SUMMARY

The technology described herein is directed towards enhanced methods and systems for automatically mapping unlabeled input data onto a target schema via semantic type detection. The input data includes a set of data elements that may be structured as a two-dimensional (2D) table comprising a set of rows and a set of columns forming a set of cells. Each data element of the set of data elements is included in a cell of the set of cells. The target schema includes a set of fields. Schema mapping, via the various embodiments, includes mapping each column of the set of columns to one or more fields of the set of fields. More particularly, the set of fields is clustered into a set of field clusters, where each field cluster of the set of field clusters includes one or more of the fields of the set of fields. Each column of the set of columns is automatically mapped to one of the field clusters of the set of field clusters. The mapping between schema fields and data columns may be automatically performed based on appropriate pairings of the detected semantic types, where the semantic types are encoded in vector representations of the fields, the field clusters, and the data elements.

The mapping is performed via three stages. In the first stage, the fields of the schema are clustered into a set of field clusters. To perform the clustering, a vector representation is generated for each field. The vector representation may be deeply learned based on the data types and field descriptions of the fields. An unsupervised clustering algorithm may be employed to generate the clustering of the vector representations.

In the second stage, a vector representation for each input data element may be generated via a similar deep learning method. Via the vector representation, an element probability may be generated for each possible pairing of a data element and a cluster. From these element probabilities, a column probability may be generated for each possible paring of a data column and a field cluster. In the third phase, the column probabilities are updated in accordance with global statistics for each column of data (e.g., the mean, variance, min, max, sum, and the like for the length of the associated data elements). A cluster is mapped to each column based on the combined statistics, which may include a combination of the column probabilities and global statistics.

DETAILED DESCRIPTION

Figure 1:
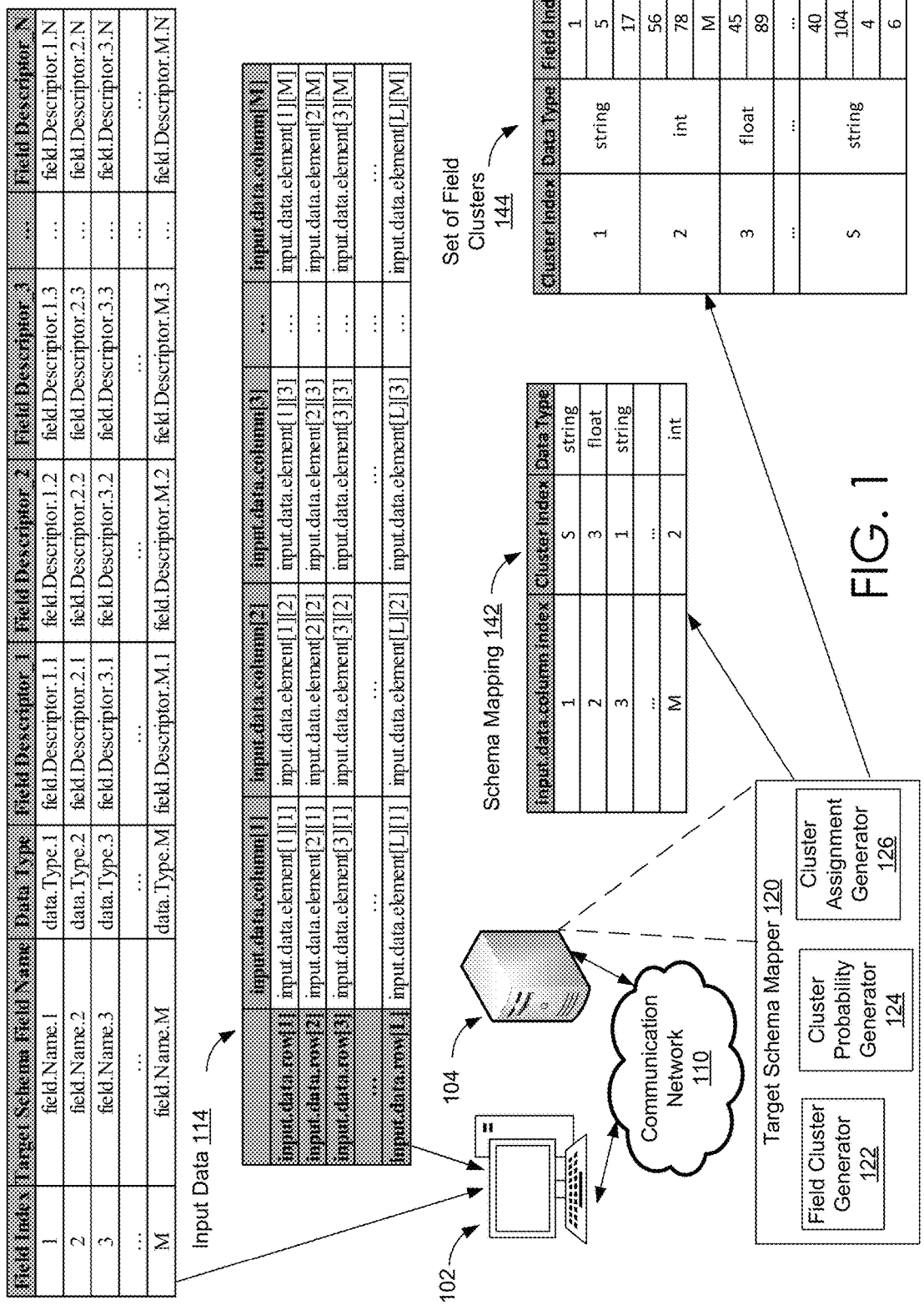
FIG. 1 illustrates an enhanced schema mapping system implementing various embodiments presented herein.

The embodiments are directed towards systems and methods that enable the automatic mapping of unlabeled input data (e.g., data to be inserted into a database) to a target schema (e.g., a database schema). More specifically, unlabeled input data may be formatted as a two-dimensional (2D) array. The 2D-nature of the input data may be structured as a 2D table (e.g., entries in a relational database), and thus organized into a set of rows and a set of columns that form a set of cells. Equivalently, the input data may be structured as a 2D array. The atomic values of the input data may be referred to as data elements and the input data includes a set of data elements. When structured as a 2D table and/or array, there is a one-to-one correspondence data elements and the cells of the table and/or array. The columns of the table may correspond to a field of a schema (e.g., a target schema). However, the unlabeled input data lacks explicit labeling of the columns. That is, the unlabeled input data lacks a mapping between fields of the target schema and the columns of the input data. Conventionally, such a mapping between input data columns and fields of a target schema is manually performed. However, such manual mapping may be an onerous and/or cumbersome task that is subject to frequent human-induced errors. To address these, and other shortcomings, of such manual interventions, the various embodiments provide automated means to generate such a mapping. The embodiments include automatically detecting semantic types of the fields and the columns of the input data. The embodiments match the detected semantic types of the fields and columns to generate at least a partial mapping between the fields of the target schema and the unlabeled columns of the input data. The semantic types are encoded in vector representations of the data elements and vector representations of the fields. In various embodiments, a machine learning (ML) model is employed to map the data columns to the fields based on the semantic types encoded in the vector representations of the fields and data columns. Various supervised training methods may be employed to train the ML model to learn a mapping between the vector representations of the fields and data columns. In at least one embodiment, mapping a data column to a field includes comparing the vector representations of the data elements associated with a column to the vector representation of the field.

In a non-limiting embodiment, a target schema is received. The target schema may include a set of target fields. Each field of the set of fields may be associated with a field name, a field data type (e.g., boolean, int, float, double, char, string, and the like), and one or more field descriptors (e.g., a set of field descriptors) that include one or more natural language-based descriptions of the data associated with the field. Because the input data is unlabeled (e.g., fields for the columns of data are not indicated), a user may wish to structure the input data in the target schema. When structuring the input data according to the target schema, each column of the input data may be mapped to a column of the target schema. More simply, the user may wish to label each column of the input data with a field name of the target schema. In some embodiments, for an input data column to be mapped to a target field of the target schema, a data type associated with the column must match the data type associated with the field. That is, a user may wish to structure the data as field-value pairs based on the target schema. For such field-value pairs, the field, for the field-value pairs of a column, is the field that is mapped to the column and the data elements included in the column are the values for each of the field-value pairs of the column. Note the example data types boolean, int, float, double, char, and string are non-limiting and other data types are possible (e.g., complex data types that include one or more combinations of lower-level data types, such as but not limited to data objects, arrays, lists, and the like).

The embodiments are directed towards automatically mapping each column of input data to a field of the target schema. Once mapped, the values stored in the data elements of the input data may be associated with the appropriate field. Thus, each row of the input data may be regarded as a record (e.g., a database record) that includes a set of field-value pairs based on the target schema. Conventionally, such mappings are performed manually. However, schemas may include hundreds (or even thousands) of fields, requiring significant manual effort. With such a significant number of fields, the manual labelling of the data may be prone to human error. Furthermore, because the values (and/or data types) of one column of the data may be similar to values (and/or data types) of one or more other columns, the manual mapping may result in ambiguities or errors.

The embodiments address these issues, and improve upon conventional means, by employing machine learning (ML) to detect the semantic types for the fields of the schema and semantic types of the values stored in the columns of data. The semantic types are encoded in vector representations of mentioned above.

The mapping between schema fields and data columns may be automatically performed based on appropriate pairings of the detected semantic types. The mapping is performed via three stages. In the first stage, the fields of the schema are clustered into a set of field clusters. To perform the clustering, a vector representation is generated for each field. The vector representation may be deeply learned based on the data types and field descriptions of the fields. An unsupervised clustering algorithm may be employed to generate the clustering of the vector representations.

In the second stage, a vector representation for each input data element may be generated via a similar deep learning method. Via the vector representation, an element probability may be generated for each possible pairing of a data element and a cluster. From these element probabilities, a column probability may be generated for each possible paring of a data column and a field cluster. In the third phase, the column probabilities are updated based on global statistics for each column of data (e.g., the mean, variance, min, max, sum, and the like for the length of the associated data elements). A cluster is mapped to each column based on the updated statistics. The column may be mapped to a single field in the cluster via manual annotation or other methods.

Example Operating Environment for Automatic Schema Mapping

FIG. 1 illustrates an enhanced schema mapping system 100 implementing various embodiments presented herein. Schema mapping system 100 is enabled to automatically map (or transform) input data 114 to a target data schema 112. Schema mapping system 100 may include at least a client computing device 102 and a server computing device 104, in communication via a communication network 110. The client computing device 102 can provide each of the target schema 112 and the input data 114 to the server computing device 104, via the communication network 110. The server computing device 104 implements a target schema mapper 120. The target schema mapper 120 is enabled to map the input data 114 onto the target schema 112 and provide the schema mapping 142 to the client computing device 102, via the communication network 110, as discussed below.

Communication network 110 may be a general or specific communication network and may directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 104.

As shown in FIG. 1, each of the target schema 112 and the input data 114 are formatted as two-dimensional (2D) data structures (e.g., 2D tables). The 2D tables are organized as a set of columns and a set of rows, wherein each unique pair of column and row forms a correspondingly unique cell of the table. The embodiments are not limited to 2D target schemas and input data. For instance, a "higher dimensional" target schema and/or a "higher dimensional" input data may be recursively "flattened" into a corresponding 2D structure. Upon mapping the flattened input data onto the flattened target schema, the "mapped and flattened" input data may be recursively "expanded" back into its higher dimensional structure. When expanded, the "flattened mapping" may be similarly expanded, such that the higher dimensional input data in mapped onto the higher dimensional target schema. As such, many of the embodiments discussed herein are 2D embodiments.

Furthermore, because relational databases are typically organized as 2D tables, many of the embodiments discussed herein are in the context of a relational database model. For example, input data 114 may encode a table of data objects to be inserted into a relational database, via the target schema 112. However, the embodiments are not so limited, and the various methods discussed are applicable to other data management/data processing applications.

Target schema 112 may include a set of fields. The set of fields of the target schema 112 may include M fields, where M is any positive integer greater than 1. Each field is associated with a unique index (e.g., 1, 2, 3, . . . , M) and unique field name (e.g., field.Name.1, field.Name.2, field.Name.3, . . . , field.Name.M). Furthermore, each field is associated with a data type (e.g., boolean, char, string, int, float, double, and the like), indicated by data.Type.x, where x is the corresponding field index. The embodiments are not limited to one-dimensional (1D) data types, and data types may include higher dimensional data types, such as but not limited to arrays, vectors, matrices, and/or higher dimensional tensors of booleans, chars, strings, ints, floats, doubles, and the like. In various embodiments, the data type associated with a field may be a complex data type that includes a combination of one or more simpler data types (e.g., a combination of one or more booleans, chars, strings, ints, floats, doubles, and the like). For example, a data type may include a data structure or data object composed of multiple data types. Each field may include one or more field descriptors (e.g., a set of field descriptors), which may be a natural language-based (e.g., a string) description of the data associated with the field. That is, each field may be associated with a set of field descriptors, where each field descriptor of the set of field descriptors includes a sequence of one or more natural language tokens. In the non-limiting embodiment of FIG. 1, each field is associated with a set of field descriptors that includes up to N field descriptors, where N is any natural number. The individual field descriptors are indicated as field.Descriptor.x.y, where x is the corresponding field index and y is the index for the corresponding set of field descriptors. Target schema 112 is shown in FIG. 1 as a 2D table, where each row corresponds to a particular field and the columns corresponds to the attributes of a field (e.g., field index, target schema field name, data type, and the elements of the set of field descriptors). It is understood that this table structure is non-limiting and other target schemas may be alternatively organized.

As shown in FIG. 1, the input data 114 may be structured as a L×M 2D table that includes L rows and M columns, where L is a natural number and M is a positive integer greater than 1 and may be equivalent (or at least similar to) the number of fields of the target schema 112. In some embodiments, the number of fields in the target schema (e.g., N) is greater than or equal to M, e.g., N≥M. In various embodiments, N is not less M and may be greater than M. Each row of the 2D table is indicated as input.data.row [x], each column of the 2D table is indicated as input.data.column[y], and each corresponding cell of the 2D table is indicted as input.data.element [x][y], where x and y are positive integers indicating the index of the row and column. Thus, the range of x is 1, 2, 3, . . . , L and the range of y is 1, 2, 3, . . . , M. Each row the input data 114 corresponds to a data object (or M-tuple) and each column corresponds to a field of the target schema 112. Each data object (e.g., a row of the 2D table) includes M data elements. Each cell of the data object's row includes one of the M data elements (e.g., an element or value of the M-tuple).

In some embodiments, there is a correspondence between the columns of the input data 114 and the fields of the target schema 112. Because of the correspondence between input data columns and target schema fields, each input data element of a particular column in the input data may be of an equivalent (or at least similar) data type. Thus, each column of the input data 114 may be associated with a particular data type. For example, the value for each input data element of the first input data column (e.g., input.data..column[1]) may be of a string data type. Thus, the first column may be associated with the string data type. Likewise, input.data.column[2] may be associated with the data type corresponding to float (e.g., the value of each data element of the column is a floating point). Input.data.column [3] may be associated with a string data type and the input.data.column[M] is associated an int data type. This correspondence between input data columns and target schema fields may be a one-to-one correspondence. Because the columns of the input data 114 are unlabeled, the correspondence between the columns of the unlabeled input data 114 and the fields of the target schema 112 is unknown. The target schema mapper 120 is enabled to automatically generate, at least a portion, of the correspondence. That is, the target schema mapper 120 generates, at least a partial, mapping between the fields of the target schema 112 and the columns of the input data 114.

More particularly, target schema mapper 120 may include a field cluster generator 122, a cluster probability generator 124, and a cluster assignment generator 126. The field cluster generator 122 receives the target schema 112 as input and generates a set of field clusters 144. The set of field clusters 144 may include S field clusters, where S is any positive integer. Each field cluster of the set of field clusters 144 includes one or more fields of the target schema's 112 set of fields. Furthermore, each field cluster of the set of field clusters is associated with a specific data type. The set of field clusters 144 may be encoded in the 2D array (or 2D table) shown in FIG. 1. More specifically, each field cluster of the set of field clusters 144 may be indexed by a cluster index and may be encoded by the field indices of the fields included in the cluster as shown in the 2D table encoding the set of field clusters 144. For example, a first cluster (with a cluster index of 1) of the set of field clusters 144 is associated with a string data type and includes three of the schema's 112 fields with field indices of 1, 5, and 17. Various embodiments of a field cluster generator 122 are discussed in conjunction with FIG. 2. As discussed in conjunction with FIG. 2, the field cluster generator 122 may generate a vector encoding for each field (e.g., a field vector) and a vector encoding for each field cluster (e.g., a field cluster vector). The vector encoding represents the corresponding field/field cluster in a deeply-learned vector space.

The vector encodings of the target schema 112, as well as the input data 114 is provided to the cluster probability generator 124. The cluster probability generator 124 is generally responsible for calculating a cluster-column probability for each possible pairing of one of the M columns of the input data 114 and one of the L field clusters of the set of field clusters 144. The cluster-column probabilities may be encoded in a 2D column probability array. Various embodiments of the cluster probability generator 124 are discussed in conjunction with FIG. 3. However, briefly here, the cluster probability generator 124 generates a vector encoding of each input data element of the input data 112 (e.g., a data element vector). The data element vector represents the corresponding input data element in an equivalent (or at least similar vector space) as the vector space for the vector encodings of the target schema's 112 fields and field clusters. A machine learning (ML) model may be employed to calculate the cluster-column probabilities. The model may be pre-trained to learn a mapping from the vector encodings of the data elements to the vector encodings of the target schema's 112 fields. The mapping may be a probabilistic mapping, and the ML model may be trained to calculate the cluster-column probabilities that constitute the probabilistic mapping. Thus, the cluster-column probabilities are calculated based on an ML model generating a mapping between the vector encodings of each data element of a particular column with the vector encodings of the corresponding fields and/or field clusters.

The cluster-column probabilities are provided to the cluster assignment generator 126. The cluster assignment generator 126 is generally responsible for updating and/or refining the cluster-column probabilities based on global statistics of the columns of input data 114. The cluster assignment generator 126 assigns each column of the input data 114 to one (or more) of the field clusters of the set of field clusters 144. That is, the cluster assignment generator 126 generates a schema mapping 142, where each input data column index is mapped to a field cluster index. The schema mapping 142 may be encoded in a 2D table data structure, as shown in FIG. 1. For example, as shown in the 2D table 142, input.data.column[1] is mapped to the field cluster indicated by the field cluster index S, input.data.column[2] is mapped to the field cluster indicated by the field cluster index 3, input.data.column[3] is mapped to the field cluster indicated by the field cluster index 1, and input.data.column [M] is mapped to the field cluster indicated by the field cluster index 2. In various embodiments, the data type associated with the field column (e.g., the data type associated with each field included in the field cluster) is equivalent (or at least similar) to the data type associated with input column mapped to the field cluster. As shown in the schema mapping table 142, a string data type is associated with both the $S^{th}$ field cluster and the first input data column. Similarly, a float data type may be associated with each of the second input data column and the third field cluster. A string data type is associated with both the third input data column and the first field cluster. An integer data type may be associated with both the $M^{th}$ input data column and the second field cluster. Note that, for at least some of the field clusters, more than one input data column is mapped to the field cluster. In some embodiments, since the correspondence between the input data columns and the schema fields is a one-to-one correspondence, the number of input data columns that are mapped to a particular field cluster is equivalent (or at least similar to) the number of fields assigned to the field cluster.

In various embodiments, the schema mapping 142 may be employed to map (or assign) each input data column to a field. For instance, the one-to-one data column to field mapping may be generated from the data column to field cluster mapping via manual means. In other embodiments, the column probabilities may be further employed to generate the one-to-one data column to field mapping.

Figure 2:
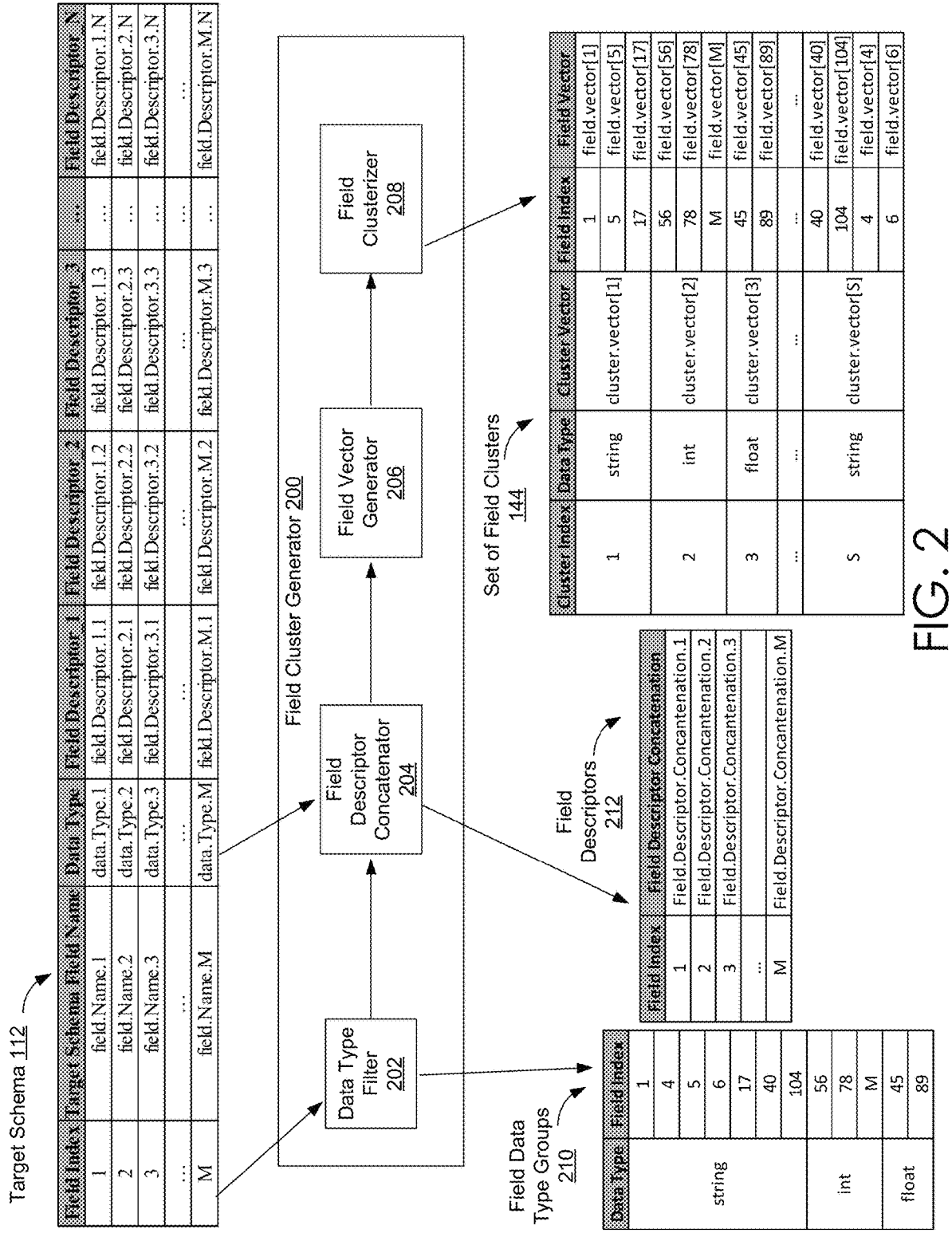
FIG. 2 illustrates an example embodiment of a field cluster generator of the target schema mapper of FIG. 1, according to various embodiments.

FIG. 2 illustrates an example embodiment of a field cluster generator 200 of the target schema mapper 120 of FIG. 1, according to various embodiments. Field cluster generator 200 may be similar to field cluster generator 122 of FIG. 1. Field cluster generator 200 may include a data type filter 202, a field descriptor concatenator 204, a field vector generator 206, and a field clusterizer 208. Data type filter 202 is generally responsible for generating an encoding of field data type groups 210. As noted above, a particular data type (e.g., boolean, char, string, int, float, double, and the like) is associated with each field of the target schema 112 and each column of the input data 114. For a schema mapping to be coherent, the data type of the input data column should be equivalent (or at least similar) to the data type of the field that the input data column is mapped to. Thus, each field included in a field cluster should be of an equivalent (or at least similar) data type. The data type filter 202 filters (or sorts) the fields of the target schema 112 on data type of generate an encoding (e.g., a 2D table data structure) of field data type groups. Thus, the data type filter 202 may serve as a field pre-clusterizer that generates groupings (or pre-clusters) of fields of common (or shared) data types.

The encoding of the field data type groups 210 may be a 2D table data structure, as shown in the 2D table encoding the field data type groups 210. According to this table, the schema fields with the field indices of 1, 4, 5, 6, 17, 40, and 104 are associated with a string data type. Likewise, the schema fields with the field indices of 56, 78, and M are associated with an int data type and the fields with the field indices 45 and 89 are associated with a float data type. Note, the field data type groups 210 table shown in FIG. 2 is not a complete table of all the available data types.

The field descriptor concatenator 204 generates a string for each schema field that is based on a concatenation of each of the field descriptors for the field. The string may be referred to as a field descriptor concatenation and may be encoded in a 2D table data structure: field descriptors 212. The field descriptor concatenation for the schema field with a field index of 1 may be the string "<field.descriptor.1.1, field.descriptor1.2, field.descriptor.1.3, . . . , field.descriptor.1.N>". Thus, the field descriptor concatenation for a field includes a sequence of natural language tokens. The other field descriptors may be similarly constructed and encoded in the field descriptor table 212. The field descriptor concatenation for a field may provide a string that is representative of the field in a "natural language space." The field descriptors 212 are provided to the field vector generator 206.

Field vector generator 206 is generally responsible for generating a field vector for each field of the set of fields based on the field descriptor concatenation for the field. The field vector for the field represents the field within a vector space. To generate such a vector representation for each field, the field vector generator 206 may implement a natural language processing (NLP) model that generates a vector quantity from a natural language-based string quantity (e.g., the field descriptor concatenation for the field). The NLP model may generates a vector from the sequence of natural language tokens of the field descriptor concatenation. The NLP model may be a deeply learned model that is trained on sequential data (e.g., sequences of tokens). In some embodiments, the NLP model may be transformer model employing attentional mechanisms that are enabled to handle sequential data. The NLP model may be a bidirectional encoder model, such as but not limited to a bidirectional encoder representations from transformers (e.g., a BERT) model. The NLP model may be pre-trained and refined via one or more specific textual corpuses. In at least one embodiment, a pre-trained BERT model is fine-tuned by employing the Stanford Natural Language Inference (SNLI) corpus to predict similarity scores for pairs of sequences of tokens. Thus, the field vector generator 206 generates a vector (in the deeply-learned vector space of the implemented NLP model) for each field of the set of target fields. The field vector generator 206 provides the field vectors to the field clusterizer 208.

The field clusterizer 208 generates the set of field clusters 144 from the field vectors. In various embodiments, the field clusterizer 208 employs one or more clustering algorithms, such as but not limited to an unsupervised clustering algorithm. For example, field clusterizer 208 may generate clusters of the field vectors, in the vector space of the BERT model. The unsupervised clustering algorithm may be a "bottom-up" and/or hierarchical clustering algorithm, such as an agglomerative clustering algorithm. In some embodiments of the agglomerative clustering algorithm, the field clusterizer 208 generates a similarity (or proximity) score for each pair of fields. The similarity score for a pair of fields is based on the field vectors for each field of the pair. For example, the similarity score for a pair may be based on a cosine similarity score (e.g., a normalized dot product) for the pair of vectors, a distance metric (e.g., a Euclidean distance, Manhattan distance, and the like) for the pair of vectors, or any other such metric based on a comparison of a pair of vectors. The similarity scores for the pairs of fields may be encoded in an M×M symmetric similarity (or proximity) matrix. The clustering algorithm may employ the similarity matrix to generate the set of field clusters 144.

In some of the agglomerative clustering embodiments, for its initial iterative step, each field is considered as a cluster of one field (e.g., M singleton clusters). The two "most similar" (or "most proximate") pair of fields (e.g., a first field and a second field of the set of fields), based on the similarity (or proximity) scores are merged to form a single first cluster. In embodiments where a data type is associated with each cluster of the set of clusters 144, a requirement for classifying a pair of fields as the two most similar (or proximate) fields is that the two fields are associated with an equivalent (or at least similar) data type. For such embodiments, the field data type groups table 210 may be consulted. If the two most similar fields are of dissimilar data types, the next most similar pair (that are of the same data type) may be merged to form the cluster. A first cluster vector for the first cluster may be generated based on a first field vector (representing the first field of the field pair) and a second field vector (representing the second field of the field pair). For example, the centroid (e.g., a geometric center of gravity) of the first and second field vectors may be calculated. The first cluster vector (which represents the first cluster in the NPL model's vector space) may be set to the centroid of the first and second field vectors. The first and second fields may be removed from the set of fields, and a "pseudo-field" (a field cluster) representing the first cluster may be added to the set of fields, where the first cluster vector represents the added "pseudo-field". The similarity (or proximity) scores may be updated, and an updated (M−1)×(M−1) symmetric similarity (or proximity) matrix may be generated based on the updated scores.

This iterative process may be continued until one or more threshold tests are exceeded. After the initial step, fields (e.g., singleton clusters) may be merged with other singleton clusters to form a cluster, a singleton cluster may be merged with a multi-field cluster to form a cluster, and/or a multi-field cluster may be merged with another multi-field cluster to form another cluster. The threshold test may be based on a minimum similarity score needed to merge fields/clusters, or the threshold may be based on a minimum number of clusters (e.g., the clustering algorithm is terminated prior to reach a minimum number of clusters). Because each cluster is associated with a single data type, a separate threshold value may be employed for each data type. For example, a first minimum similarity score may be applied as a threshold for clusters associated with an int data type and a second minimum similarity score may be applied as another threshold for clusters associated with a float data type. Note that the set of field clusters table 144 shown in FIG. 2 includes a column for the cluster vectors and another column for the field vectors. The cluster vectors are indicated as cluster.vector[x], where x indicates the cluster index. The field vectors are indicated as field.cluster[y], where y indicates the field index. After the clustering algorithm has terminated (via one or more threshold tests), the set of field clusters 144 (including the cluster/field vector representations) may be provided to a cluster probability generator (e.g., cluster probability generator 124 of FIG. 1 and/or cluster probability generator 300 of FIG. 3).

Figure 3:
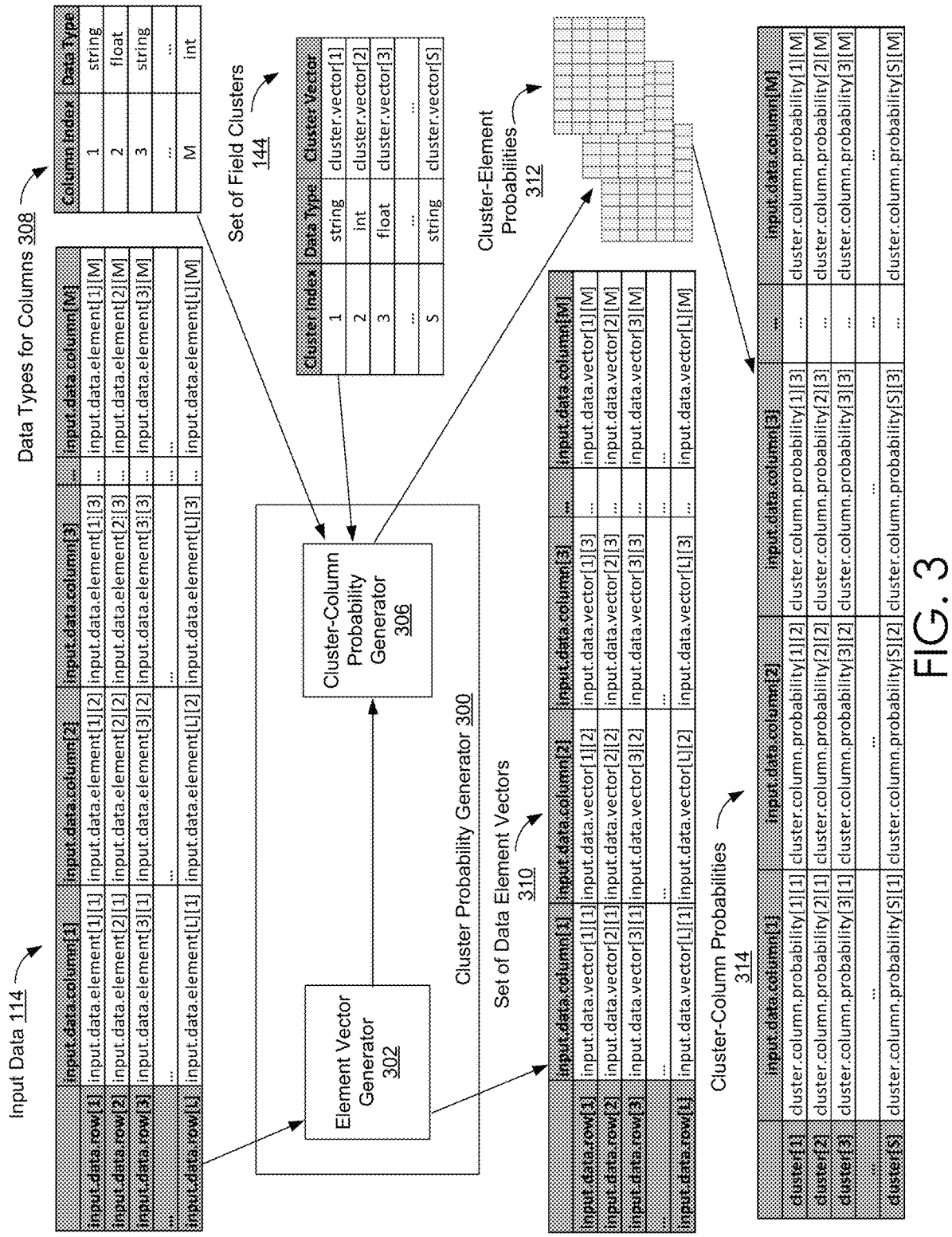
FIG. 3 illustrates an example embodiment of a cluster probability generator of the target schema mapper of FIG. 1, according to various embodiments.

FIG. 3 illustrates an example embodiment of a cluster probability generator 300 of the target schema mapper 120 of FIG. 1, according to various embodiments. Cluster probability generator 300 may be equivalent (or at least similar) to cluster probability generator 124 of FIG. 1. Cluster probability generator 300 may include an element vector generator 302 and a cluster-column probability generator 306. Element vector generator 302 is generally responsible for generating a data element vector for each data element of the input data 114. That is, element vector generator 302 receives the input data 114 and generates a data element vector (e.g., element vector) for each data element of the set of data elements included in the input data 114. Each data element vector represents the corresponding data element in an equivalent (or at least similar) vector space to the vector space that the field vectors and field vector clusters (generated by field cluster generator 200 of FIG. 2) are embedded in. Thus, the element vector generator 302 may employ an equivalent (or similar) NLP model to the NLP model employed by the field vector generator 206 of the field cluster generator 200.

The element vector generator 302 may employ a bi-directional transformer NLP model, such as but not limited to a BERT model, to generate the set of data element vectors 310. Similar to the data elements of the input data 114, the corresponding data element vectors 310 may be stored in the 2D table shown in FIG. 3, and referenced as input.data.vector[x][y], where x is the row's index and y is the column's index. Because data elements within the same column should be mapped to the same target field, the NLP model (e.g., a BERT model) may be pre-trained to generate clusters of data element vectors that are included in the same column. For example, the NLP model employed by the element vector generator 302 (and/or the NLP model employed by the field vector generator 206) may be pre-trained on a large unlabeled textual corpus such at least a portion of Wikipedia, collection of digital books, or the like. The data element vectors 310 and the set of field clusters 144 are provided to the cluster-column probability generator 306. For simplicity in FIG. 3, the field indices and the field vectors of the set of field clusters 144 have been omitted.

The cluster-column probability score generator 306 is generally responsible for generating a probability for each possible pairing of an input data element (of the set of input data elements) and a field cluster (of the set of field clusters) based on a machine learning (ML) model that is pre-trained to determine a mapping between data elements and field clusters. The ML model learns how to calculate probabilities for each data element being paired with each of the field clusters of the set of field clusters 144. The ML model may employ a softmax function to generate the probabilities. In some embodiments, the ML model is implemented via a neural network. The neural network may include a softmax That is, the ML model is trained to determine which data elements are mappable to which target fields in a probabilistic sense. The cluster-element probabilities 312 are generated based on the vector embeddings of the data elements and the field clusters. Note that the resulting set of cluster-element probabilities 312 may be structured as a 3D array (or table), with a first dimension associated with the data element's row, a second dimension associated with the data element's column, and a third dimension associated with the paired field cluster.

The cluster-column probability generator 306 is further responsible for transforming the 3D cluster-element probabilities 312 into 2D cluster-column probabilities 314. The cluster-column probabilities 314 include a probability for each possible pairing of an input column of the input data 114 and a field cluster of the set of field clusters 144, where the probability indicates the likelihood that the corresponding input column is mapped to the corresponding field cluster. The cluster-element probabilities 312 may be referenced as $p_{i,j,k}$, where the index i refers to input data rows, the index j refers to the input data columns, and the index k refers to the field clusters. The probabilities may be averaged over the input rows to generate a set of cluster-column probabilities, via $P(j,k)=\Sigma_{i=1}^{L} p_{i,j,k}$. In the 2D table of the cluster-column probabilities 314, cluster.column.probability [k][j] indicates P(j,k). In various embodiments where the data type associated with a column should match the data type of the mapped column, the data types of the columns 308 are compared to the data type of the cluster (as indicated by the set of field clusters 144) to ensure that the cluster-column probabilities 314 for any pairing of a column and field cluster with non-equivalent (or non-similar) data types are identically set to 0.0.

Figure 4:
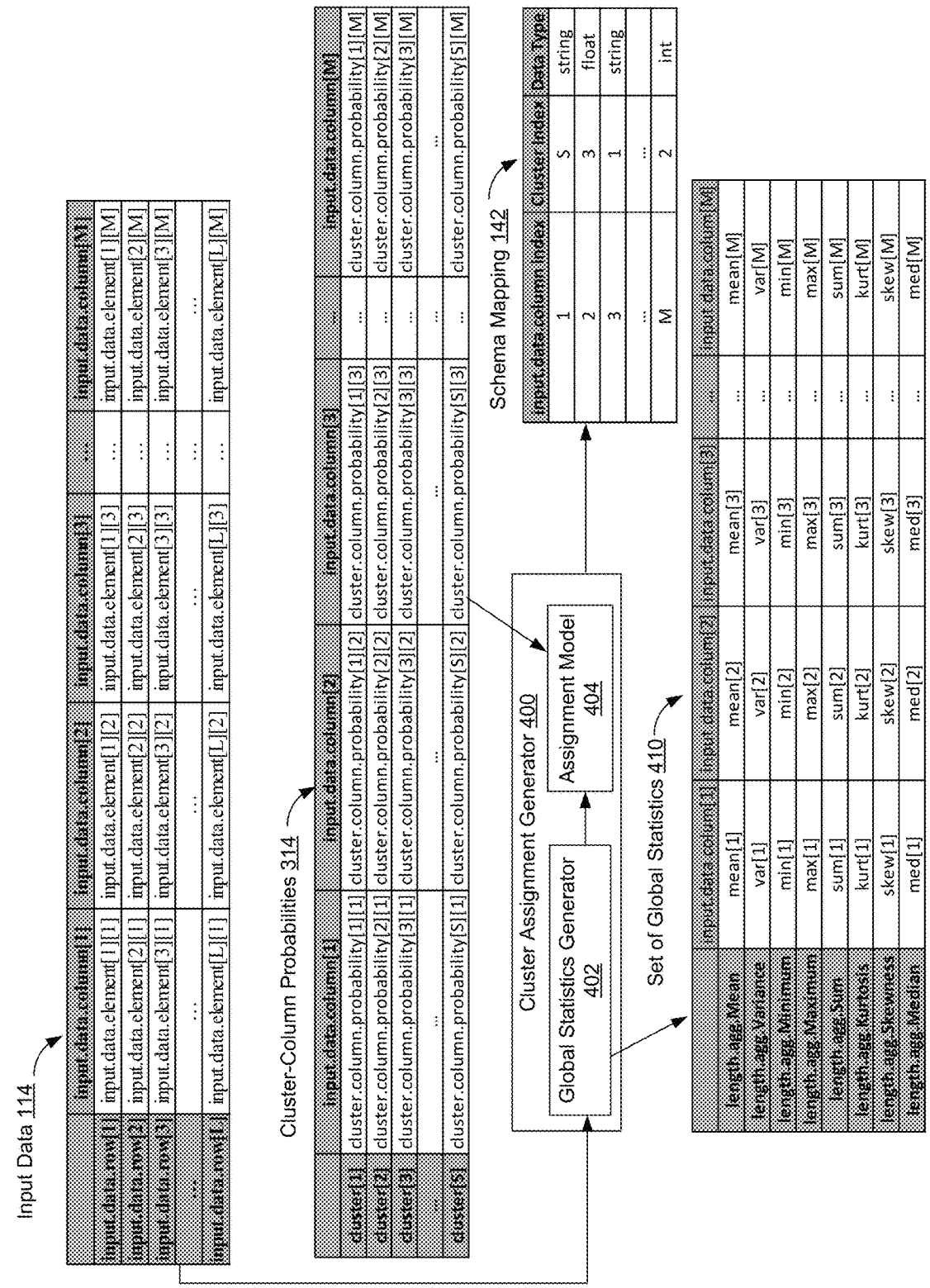
FIG. 4 illustrates an example embodiment of a cluster assignment generator of the target schema mapper of FIG. 1, according to various embodiments.

FIG. 4 illustrates an example embodiment of a cluster assignment generator 400 of the target schema mapper 120 of FIG. 1, according to various embodiments. Cluster assignment generator 400 may be equivalent (or at least similar) to cluster assignment generator 126 of FIG. 1. Cluster assignment generator 400 may include a global statistics generator 402 and an assignment model 404. The input data 114 may be received by the global statistics generator 402. The global statistics generator 402 is generally responsible for generating global statistics of each column of the input data 114. The global statistics for each column of the set of columns may be encoded in a 2D array and/or table, as shown in the set of global statistics 410. The global statistical may be aggregated length statistical distributions (for each input data columns) to form statistical distributions for various metrics. As shown in the set of global statistics 410, the global statistics may include (for each column) the mean (or average) length of the data elements in the column, the variance of the length of the data elements in the column, the minimum length of the data elements in the column, and the minimum length of the data elements in the column. In some embodiments, the set of global statistics additional the kurtosis, skewness, and media of the underling length distributions of the data elements in the columns.

The set of global statistics and the cluster-column probabilities 314 are provided to the assignment model 404. The assignment model may implement one or more machine learning (ML) models that combine the set of global statistics 410 and the set cluster-column probabilities 314 to generate the schema mapping 142. The ML models may be implemented by one or more neural networks (or at least one or more neural network layers). The ML model may be trained (e.g., via one or more deep learning methods) on the global statistics 410 and the cluster-column probabilities 314 to recognize patterns in the global statics and data types to generate an accurate schema mapping 112.

Generalized Processes for Mapping Unlabeled Input Data onto a Target Schema

Figure 7:
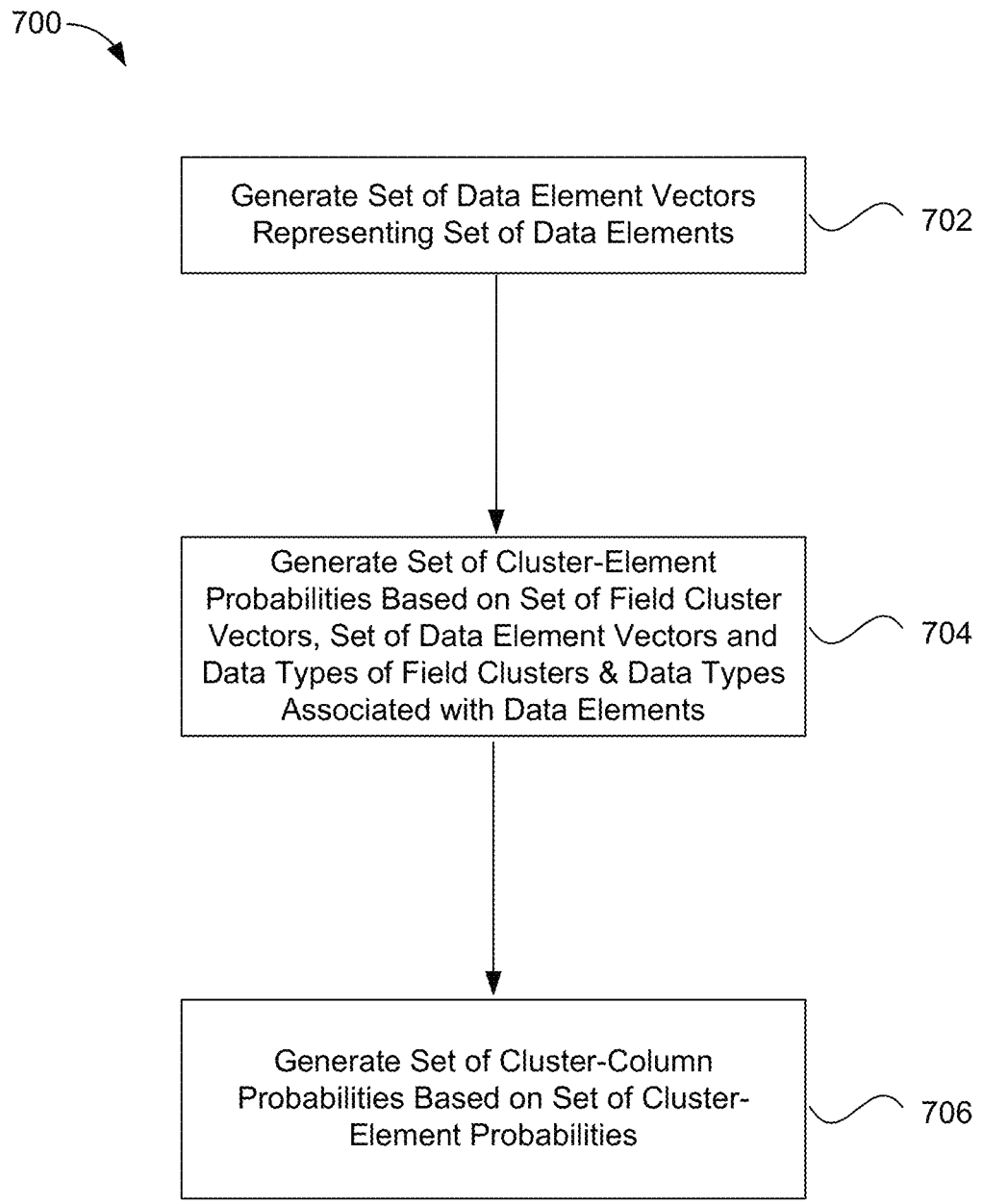
FIG. 7 illustrates one embodiment of a method for generating field cluster-probabilities for columns and fields, which is consistent with the various embodiments presented herein.
Figure 8:
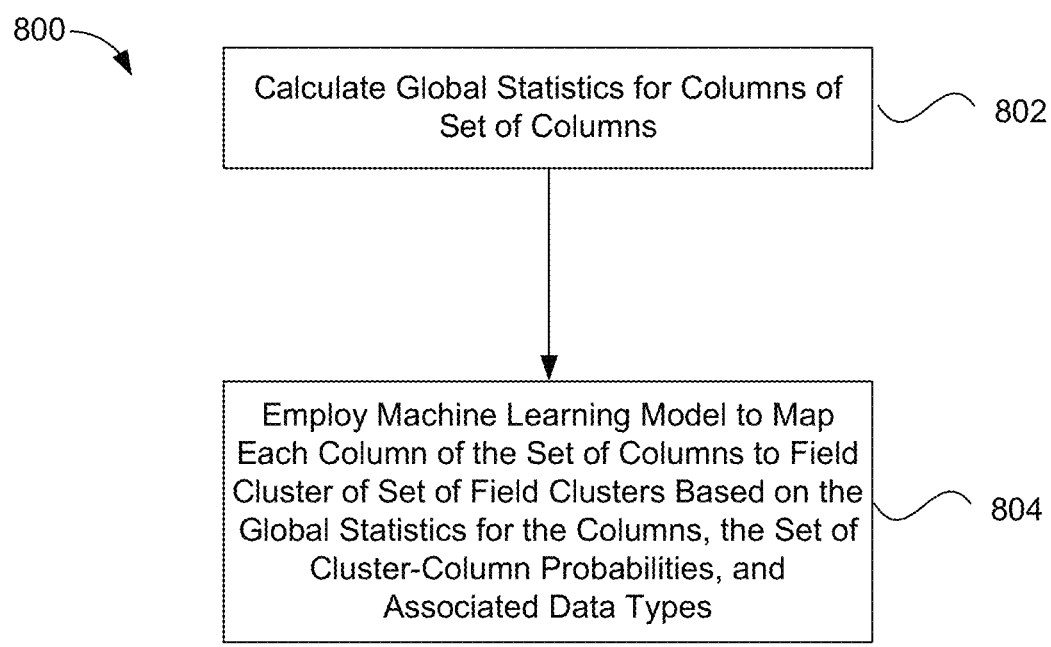
FIG. 8 illustrates one embodiment of a method for assigning data columns to field cluster, which is consistent with the various embodiments presented herein.
Figure 9:
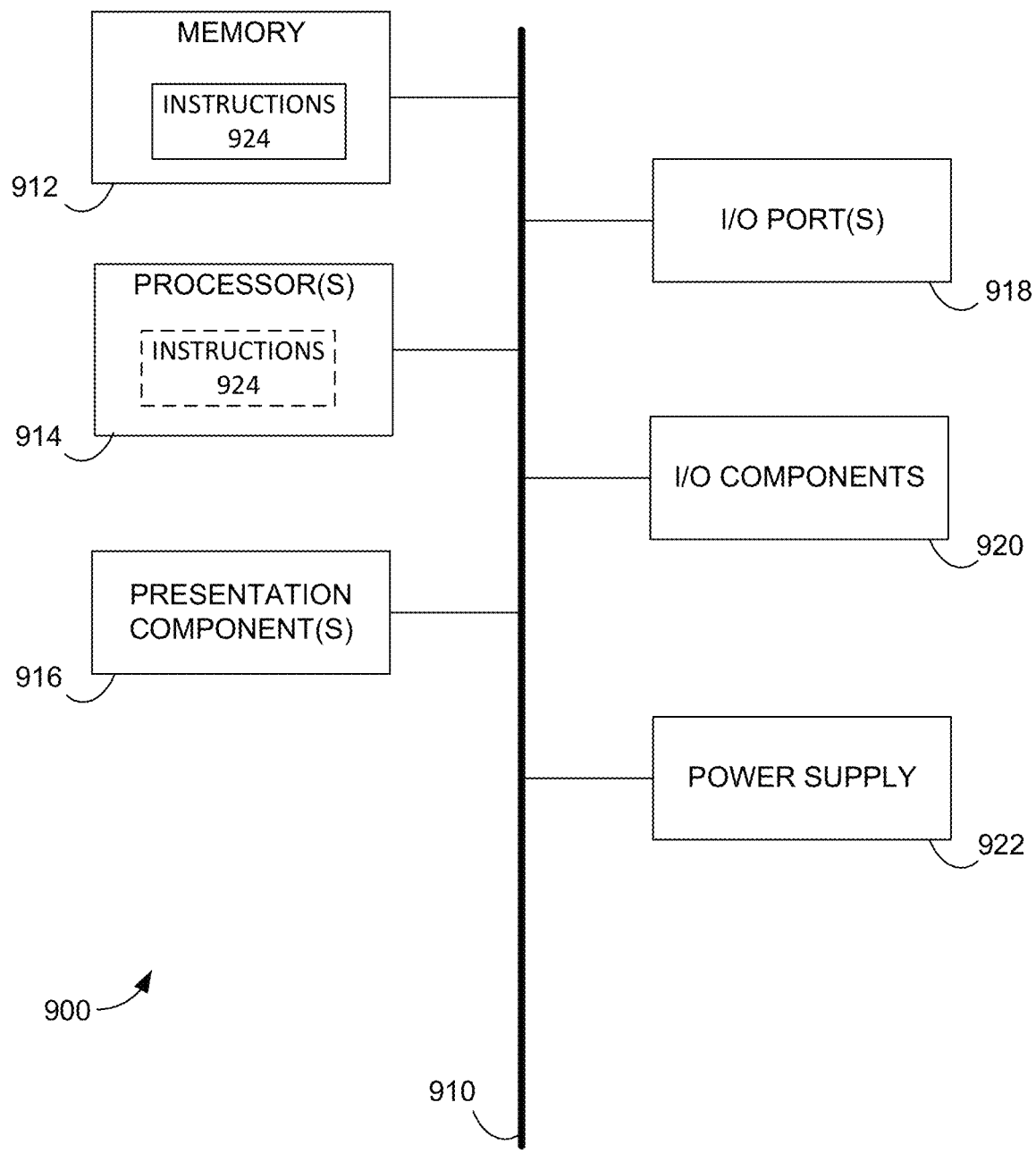
FIG. 9 is a block diagram of an example computing device in which embodiments of the present disclosure may be employed.

Processes 500-800 of FIGS. 5-8, or portions thereof, may be performed and/or executed by any computing device, such as but not limited to, client computing device 102 of FIG. 1, server computing device 104 of FIG. 1, and/or computing device 900 of FIG. 9. Additionally, a target schema mapper, such as but not limited to target schema mapper 120 of FIGS. 1, may perform and/or execute at least portions of process 500-800.

Figure 5:
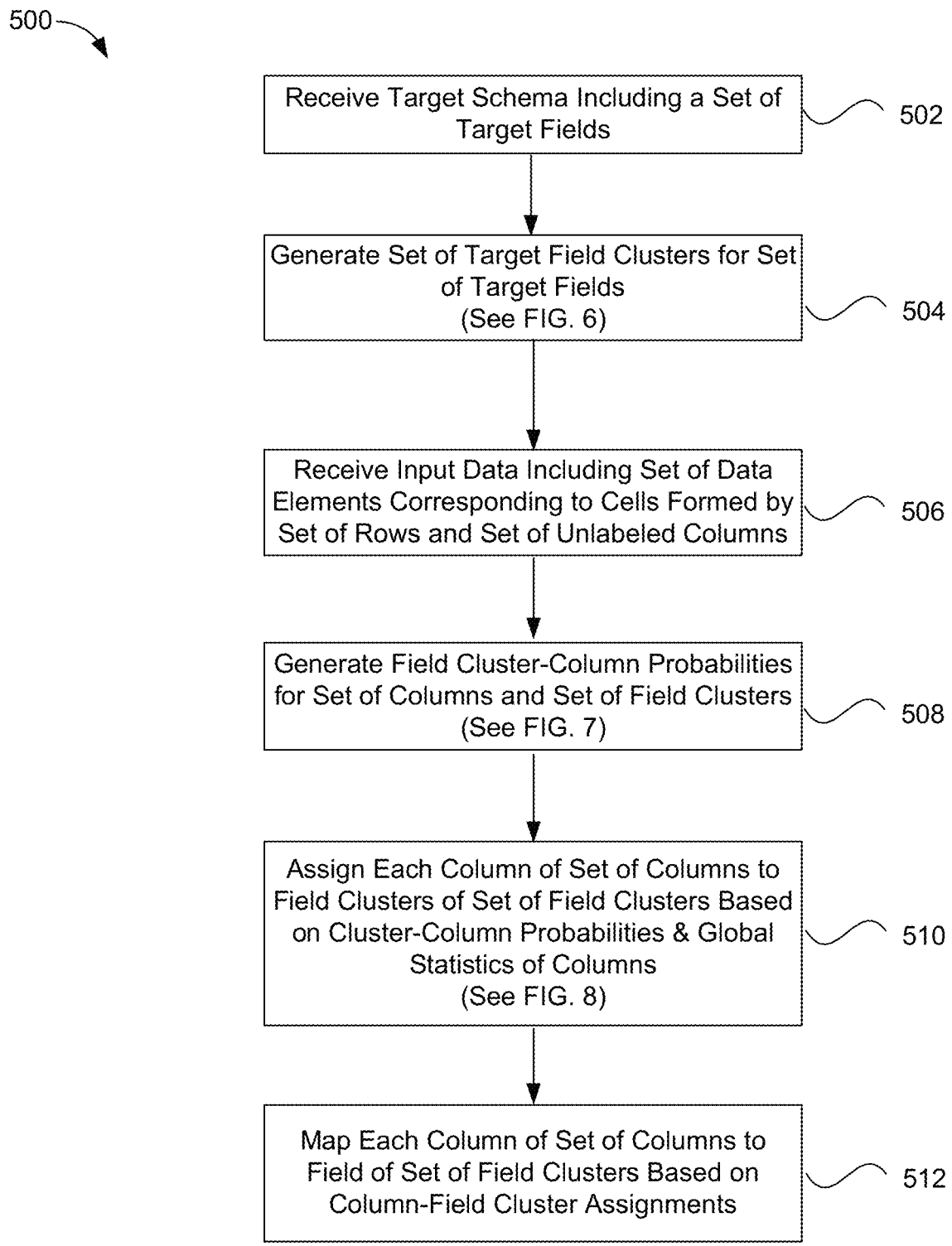
FIG. 5 illustrates one embodiment of a method for mapping unlabeled data onto a target schema, which is consistent with the various embodiments presented herein.

FIG. 5 illustrates one embodiment of a method for mapping unlabeled data onto a target schema, which is consistent with the various embodiments presented herein. Process 500 may be performed by a target schema mapper, such as but not limited to target schema mapper 120 of FIG. 1. Process 500 begins at block 502, where a target schema that includes a set of target fields is received and/or accesses. The target schema may be similar to target schema 112 of FIG. 1. Accordingly, each target field of the set of target fields may be associated with a set of field descriptors. At block 504, a set of target field clusters is generated for the set of target fields. Various embodiments of generating a set of field clusters is discussed in conjunction with at least process 600 of FIG. 6. However, briefly here, at block 504, the set of target fields is clustered into a set of field clusters. The set of field clusters may be similar to the set of field clusters 144 of FIGS. 1-2. When clustering, each target field is assigned to one or more field clusters of the set of field clusters. Each field cluster of the set of field clusters may be represented by a field cluster vector. The field cluster vector may be generated based on the set of field descriptors associated with each target field assigned to the field cluster, with a vector space. As noted throughout, each target field of the set of target fields is associated with a particular data type. The set of fields may be clustered in the set of field clusters based on the data type associated with field of the set of fields.

At block 506, input data is received and/or accessed. The input data may be similar to input data 114 of FIG. 1. Thus, the input data may include a set of input data elements structured in and/or corresponding to a set of data cells formed by a set of data rows and a set of data columns. The set of data elements may be organized as a 2D table or array. Thus, each data element of the set of data elements is reference by (or associated with) a first integer value corresponding to a first index (associated with a row of the set of rows) and a second value corresponding to a second index (associated with a column of the set of columns). More particularly, the set of data elements is structured as a 2D data array that includes the set of data rows and the set of data columns. Each data element of the set of data elements that is associated with a same first value corresponding to the first index is included in the same row of the set of data rows. Each data element of the set of data elements that is associated with a same second value corresponding to the second index is included in the same column of the set of columns.

At block 508, a set of field cluster-column probabilities is generated for the set of columns and the set of field clusters.

Various embodiments of generating the set of field cluster-column probabilities is discussed in conjunction with process 700 of FIG. 7. However, briefly here, a data element vector may be generated for each data element of the set of data elements. The data element vector represents the corresponding data element in the vector space. The field-cluster probabilities for a paired field cluster and column is based on the cluster vector representing the field cluster and the element vector of the data element.

At block 510, each column of the set of columns is assigned to (or associated with) a field cluster of the set of field clusters based on the cluster-column probabilities and global statistics of the columns. Various embodiments of assigning columns to field clusters as discussed in conjunction with process 800 of FIG. 8. Assigning columns to cluster fields may generate a schema mapping, such as but not limited to schema mapping 142 of FIG. 1. However, briefly here, assigning a column to a particular field cluster may include assigning each data element of the set of data elements, which is associated with a particular second value corresponding to the second index, with the particular field cluster of the set of field cluster based on the particular cluster vector of the particular field cluster and the data element vector of each data element that is associated with the particular second value. That is, each data element in a column is assigned to the particular field cluster. Assigning (or associating) each data column of the set of data columns with a field cluster of the set of field clusters is based on the cluster vector of the field cluster and the data element vector of each data element included in the data column. At block 512, each column in the set of columns may be mapped to a field of the set of fields based on the column-field cluster assignments. For example, a column may be mapped (or assigned) to a field included in its assigned field cluster by automatic and/or manual means.

Figure 6:
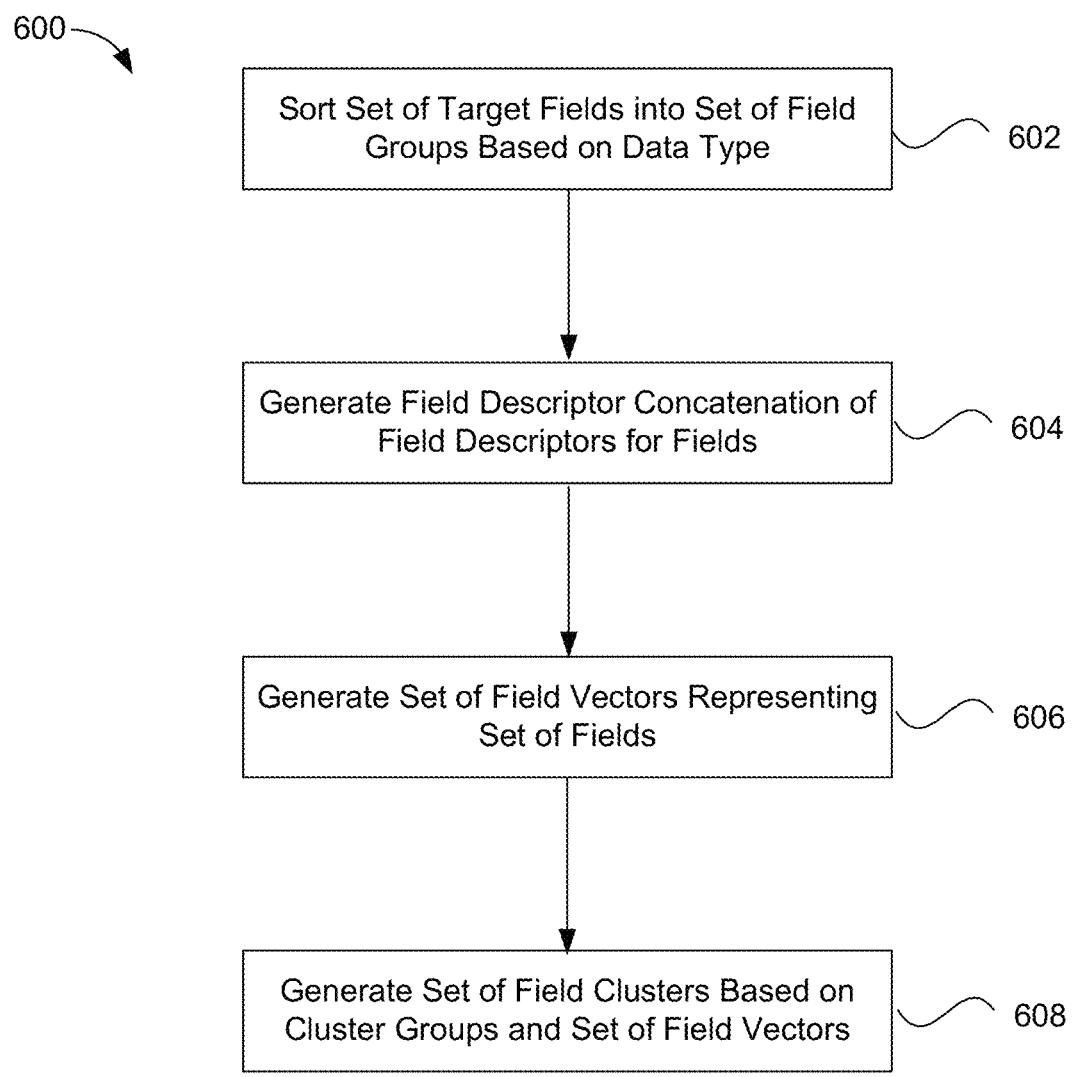
FIG. 6 illustrates one embodiment of a method for generating a set of target field clusters for a target schema, which is consistent with the various embodiments presented herein.

FIG. 6 illustrates one embodiment of a method for generating a set of target field clusters for a target schema, which is consistent with the various embodiments presented herein. Process 600 may be performed by a field cluster generator, such as but not limited to field cluster generator 122 of FIG. 1 and/or field cluster generator 200 of FIG. 2. Process 600 begins at block 602, where the set of target field (of the target schema) is sorted (or filtered) in a set of field groups based on the data type associated with the fields. As, noted throughout, each field is associated with a particular data type. At block 602, the data type filter 202 of FIG. 2 may generate a set of field groups, where the field groups are filtered via the associated data type. The set of field groups may be similar to field data type groups 210 of FIG. 2, and may be employed by the field cluster generator to cluster the set of field values into a set of field clusters (e.g., set of field clusters 144 of FIGS. 1-2) based on the data type associated with each group and each data types associated with the data elements.

At block 604, field descriptor concatenations are generated from the set of field descriptors associated with each target field of the set of target fields. For example, the field descriptor concatenator 204 of FIG. 2 may generate field descriptors 212 of FIG. 2 at block 604. At block 606, a set of field vectors representing the set of fields is generated based on the field descriptor concatenation for each of the fields. The field vector generator 206 of FIG. 2 may implement a NLP model to generate the set of field vectors. More specifically, the field vector generator 206 may generate a field vector for each target field of the set of target fields, via its implemented NLP model (e.g., a pre-trained BERT model). The particular field vector for a particular target field is based on the set of field descriptors associated with the particular target field. The particular field vector for the target field represents the particular target field within the vector space of the implemented NLP model.

At block 608, a set of field clusters is generated based on the cluster groups generated at block 602 and the set of field vectors generated at block 606. In some embodiments, at block 608, field clusterizer 208 of FIG. 2 may cluster the set of fields into the set of field clusters 144 of FIGS. 1-2. Clustering the set of fields may be based on applying a hierarchical clustering analysis to the set of field vectors that includes the field vector representing each target field in the vector space. The clustering may be further based on the data type of each of the target fields (e.g., a necessary but insufficient condition for two field clusters being included in a common cluster is that both clusters are associated with the same (or similar) data type). Note that a set of field cluster vectors may represent the set of field clusters. A particular field cluster vector representing a particular field cluster may be determined from a centroid (e.g., a geometric center of gravity) of the field vectors of each of the fields that is included in the particular field cluster.

FIG. 7 illustrates one embodiment of a method 700 for generating field cluster-probabilities for columns and fields, which is consistent with the various embodiments presented herein. Process 700 may be performed by a cluster probability generator, such as but not limited to cluster probability generator 124 of FIG. 1 and/or cluster probability generator 300 of FIG. 3. Process 700 begins at block 702, where a set of data element vector are generated. The set of data element vectors may represent the set of data elements in an equivalent (or at least similar) vector space to that of the NLP model that generated the set of field cluster vectors, as discussed in conjunction with block 606. In some embodiments at block 702, the element vector generator 302 of FIG. 3 may generate the set of data element vectors 310 of FIG. 3.

At block 704, a set of cluster-element probabilities may be generated. The set of cluster-element probabilities may be based on the set of field cluster vectors (representing the set of target field clusters generated at block 608 of process 600) and the set of data element vectors. As discussed throughout, a machine learning (ML) model may be employed to generate the probabilities. The ML model may be pre-trained to generate the probabilities. Note that the set of cluster-element similarity scores may be encoded in a 3D array and/or table data structure.

In some embodiments, the set of cluster-element probabilities may be encoded in a 3D array and/or table data structure (e.g., cluster-element probabilities 312 of FIG. 3). The encoding array may be referred to as an element probability array. More specifically, a 3D element probability array may be generated by the cluster-column probability generator 306 of FIG. 3. The 3D element probability array may have a first dimension corresponding to the set of data rows, a second dimension corresponding to the set of data columns, and a third dimension corresponding to the set of field clusters. Each value included in the element probability array is an element probability that a data element of the corresponding data row of the set of data rows and the corresponding data column of the set of data columns is associated with the corresponding field cluster of the set of field clusters. The element probability may be calculated based on the cluster vector of the corresponding field cluster and the corresponding data element vector. As described below, each data column of the set of data columns may be associated with (or assigned/mapped to) a field cluster of the set of field clusters based on each element probability of the element probability array.

At block 706, a set of cluster-column probabilities are generated based on the set of cluster-element probabilities. For example, the cluster-column probability generator 306 may "flatten" the 3D cluster-element probabilities table 312, via a summing (or averaging) function, to generate the 2D cluster-column probabilities table 314. The encoding of the cluster-column probabilities into a 2D array may be referred to as a column probability array. More specifically, a column probability array may be generated by the cluster-column probability generator 306. The column probability array may include a first dimension corresponding to the set of data columns and a second dimension corresponding to the set of field clusters. Each value included in the column probability array is a column probability that a corresponding data column of the set of data columns is associated with the corresponding field cluster of the set of field clusters. The column probability is calculated based on a combination of each element probability of the corresponding to each of the data column and the field cluster. Each data column of the set of data columns may be associated with (or assigned/mapped to) a field cluster of the set of field clusters based on each column probability of the column probability array.

FIG. 8 illustrates one embodiment of a method 800 for assigning data columns to field cluster, which is consistent with the various embodiments presented herein. Process 800 may be performed by a cluster assignment generator, such as but not limited to cluster assignment generator 126 of FIG. 1 and/or cluster assignment generator 400 of FIG. 4. Process 800 begins at block 802, where a set of global statistics is calculated for each column of the set of columns of the input data 114. For example, global statistics generator 402 of FIG. 4 may calculate and encode the set of global statistics 410 of FIG. 4 in a 2D array and/or table data structure. The set of global statics for a particular column of the set of columns may be based on a distribution of the lengths of the data elements of the set of data elements that is associated with the particular column.

At block 804, a machine learning (ML) model may be employed to map each column of the set of columns to a field cluster of the set of field clusters. Such a mapping may generate the schema mapping 142 of FIGS. 1 and 4. The mapping may be based on the set of global statistics 410 and the cluster-column probabilities 314 of FIGS. 3-4.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A system comprising:
   a memory component; and
   one or more processing devices coupled to the memory component, the one or more processing devices to perform operations comprising:
   generating a data element vector for one or more data elements of a set of data elements in a vector space, wherein the one or more data elements are associated at least with a first index of the set of data elements and a second index of the set of data elements; and
   mapping the set of data elements onto a target schema comprising a set of target fields clustered into a set of field clusters, by associating the one or more data elements of the set of data elements with a field cluster of the set of field clusters based on: a cluster vector that represents the field cluster, and the data element vector.

2. The system of claim 1, wherein each target field of the set of target fields is associated with a set of field descriptors and is assigned to one or more field clusters of the set of field clusters.

3. The system of claim 1, wherein each field cluster of the set of field clusters is represented by a respective cluster vector.

4. The system of claim 1, wherein the set of data elements is structured as a two-dimensional (2D) data array that includes a set of data rows associated with the first index and a set of data columns associated with the second index; and
   wherein mapping the set of data elements onto the target schema further comprises mapping between the set of target fields of the target schema and the set of data columns based on pairings of semantic types.

5. The system of claim 4, the operations further comprising:
   generating a field vector for each target field of the set of target fields based on a set of field descriptors associated with each target field of the set of target fields; and
   wherein the semantic types are encoded in at least one of the data element vector, the cluster vector and the field vector.

6. The system of claim 1, the operations further comprising:
   generating a set of field vectors for the set of target fields based on a set of field descriptors associated with each target field of the set of target fields; and
   clustering the set of target fields into the set of field clusters based on applying a hierarchical clustering analysis to the set of field vectors.

7. The system of claim 1, wherein the set of data elements is structured as a two-dimensional (2D) data array that includes a set of data rows associated with the first index and a set of data columns associated with the second index, the operations further comprising:

generating an element probability array with a first dimension corresponding to the set of data rows, a second dimension corresponding to the set of data columns, and a third dimension corresponding to the set of field clusters; and associating each data column of the set of data columns with a corresponding field cluster of the set of field clusters based on the element probability array.

8. The system of claim 1, the operations further comprising:

executing a machine learning (ML) model to map data columns of the set of data elements to the set of target fields based on semantic types encoded in vector representations of the set of target fields and vector representations of the data columns.

9. The system of claim 1, the operations further comprising:

executing a machine learning (ML) model to detect semantic types for the set of target fields of the target schema and semantic types of values stored in data columns of the one or more data elements.

10. A method comprising:

receiving input data that includes a set of data elements comprising one or more data elements, wherein the set of data elements is structured as a two-dimensional (2D) data array that includes a set of data rows associated with a first index and a set of data columns associated with a second index;

generating a data element vector for the one or more data elements in a vector space; and mapping the set of data elements onto a target schema comprising a set of target fields clustered into a set of field clusters, by associating the one or more data elements of the set of data elements with a field cluster of the set of field clusters based on: a cluster vector that represents the field cluster, and the data element vector.

11. The method of claim 10, wherein mapping the set of data elements onto the target schema further comprises mapping between the set of target fields of the target schema and the set of data columns based on pairings of semantic types.

12. The method of claim 10, wherein each target field of the set of target fields is associated with a set of field descriptors and is assigned to one or more field clusters of the set of field clusters.

13. The method of claim 10, wherein each field cluster of the set of field clusters is represented by a respective cluster vector.

14. The method of claim 10, further comprising:

generating a set of field vectors for the set of target fields based on a set of field descriptors associated with each target field of the set of target fields; and clustering the set of target fields into the set of field clusters based on applying a hierarchical clustering analysis to the set of field vectors.

15. The method of claim 10, further comprising:

executing a machine learning (ML) model to map data columns of the set of data elements to the set of target fields based on semantic types encoded in vector representations of target fields of the set of target fields, and vector representations of the data columns.

16. A non-transitory computer-readable medium storing executable instructions, which when executed by one or more processing devices, cause the one or more processing devices to perform operations comprising:

assessing input data that includes a set of data elements to generate a data element vector for one or more data elements of the set of data elements in a vector space, wherein the set of data elements is structured as a two-dimensional (2D) data array that includes a set of data rows associated with a first index and a set of data columns associated with a second index;

mapping the set of data elements onto a target schema comprising a set of target fields clustered into a set of field clusters, by associating the one or more data elements of the set of data elements with a field cluster of the set of field clusters based on a cluster vector of the field cluster and the data element vector for the one or more data elements of the set of data elements.

17. The non-transitory computer-readable medium storing executable instructions of claim 16, the operations further comprising:

generating a set of field vectors for the set of target fields based on a set of field descriptors associated with each target field of the set of target fields; and clustering the set of target fields into the set of field clusters based on applying a hierarchical clustering analysis to the set of field vectors.

18. The non-transitory computer-readable medium storing executable instructions of claim 16, wherein each target field of the set of target fields is associated with a set of field descriptors and is assigned to one or more field clusters of the set of field clusters, and each field cluster of the set of field clusters is represented by a respective cluster vector.

19. The non-transitory computer-readable medium storing executable instructions of claim 16, the operations further comprising:

generating an element probability array with a first dimension corresponding to the set of data rows, a second dimension corresponding to the set of data columns, and a third dimension corresponding to the set of field clusters, wherein one or more element probabilities of the element probability array are calculated based on the cluster vector of a corresponding field cluster and a corresponding data element vector; and associating each data column of the set of data columns with a respective field cluster of the set of field clusters based on a respective element probability of the element probability array.

20. The non-transitory computer-readable medium storing executable instructions of claim 19, the operations further comprising:

generating a set of global statistics for one or more data columns of the set of data columns based at least on lengths of the one or more data elements of the set of data elements associated with the one or more data columns; and using a machine learning (ML) model, generating a schema mapping that maps each data column of the set of data columns to a respective field cluster of the set of field clusters, based on the set of global statistics for the one or more data columns of the set of data columns and the element probability array.

* * * * *